United States Patent

[11] 3,599,355

| [72] | Inventor | Kenneth E. Lockwood<br>RRT. 2, Mallard, Iowa 50562 |
|---|---|---|
| [21] | Appl. No. | 827,688 |
| [22] | Filed | May 26, 1969 |
| [45] | Patented | Aug. 17, 1971 |

[54] SNOW MOWER AND TRACTOR COMBINATION
2 Claims, 4 Drawing Figs.

[52] U.S. Cl. ................................................... 37/49,
37/117.5
[51] Int. Cl. ................................................... E01h 5/06
[50] Field of Search ........................................ 37/44—49,
117.5, 32—34

[56] References Cited
UNITED STATES PATENTS

| 325,029 | 8/1885 | Wackerman | 37/32 |
|---|---|---|---|
| 387,524 | 8/1888 | Mansfield | 37/32 |
| 1,872,484 | 8/1932 | Milhon | 37/49 X |
| 2,112,131 | 3/1938 | Bahr | 37/49 |
| 2,488,695 | 11/1949 | Upton | 37/117.5 |
| 2,863,233 | 12/1958 | Johnson | 37/117.5 |
| 3,039,210 | 6/1962 | Slaughter | 37/117.5 |
| 3,097,439 | 7/1963 | Calkin | 37/117.5 |
| 3,305,952 | 2/1967 | Dressler | 37/117.5 X |
| 3,440,744 | 4/1969 | Smith | 37/117.5 |

*Primary Examiner*—Robert E. Pulfrey
*Assistant Examiner*—Clifford D. Crowder
*Attorney*—Dawson, Tilton, Fallon & Lungmus ABSTRACT: A snow mower is removably mounted on a bucket-equipped tractor or tractor front support and has a lift blade wider than the tractor with plow wings extending to the top portion of the tractor for raising a mass of snow, dividing the mass and discharging it at an elevation laterally of the tractor path.

PATENTED AUG 17 1971

3,599,355

INVENTOR:
KENNETH E. LOCKWOOD
BY
Dawson, Tilton, Falloy & Lungmus
ATT'YS

SNOW MOWER AND TRACTOR COMBINATION

BACKGROUND AND SUMMARY

Clearing a roadway, of snow, particularly when the snow is 3 or 4 feet deep, is a major problem on farms and in rural areas. Nearly all of the farms have tractors and, in snow-accumulating areas, the tractors are provided with snow buckets and power means for raising and tilting the buckets. However, the removal of snow by buckets is tedious, time consuming, and, when the snow is quite deep, impracticable. When the bucket is pushed into deep snow, snow escapes over and around the bucket and piles up against the flat front end of the tractor, and snow pressure from the sides stops forward progress. Large snowplows with crawler tractors can remove snowdrifts, but these are very expensive and usually not available to the farmer.

If it were possible to provide a snow mover which could be readily applied to and removed from the usual farm tractor bucket carried by the tractor, a substantial advance would be made toward solving the problem.

I have discovered that a snow mover having a wide blade extending laterally of the tractor and having plow wings starting at an elevation above an unobstructed lifting portion of the blade can be removably anchored upon a bucket or forward support of a tractor so as to provide a clear path of travel for the tractor wheels while delivering the raised and divided snow mass laterally of the tractor path. The power lift means permit the mover blade to engage the snow at different elevations and to remove it in repeated bites.

DRAWING

In the accompanying drawing.

Figure 3:
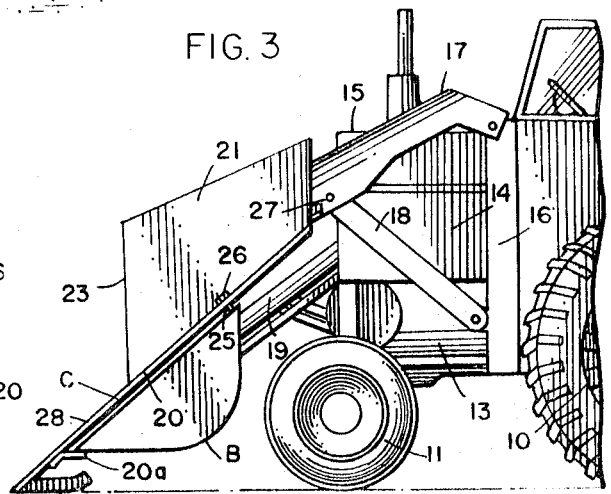

FIG. 3, a broken side view in elevation; and

Figure 4:
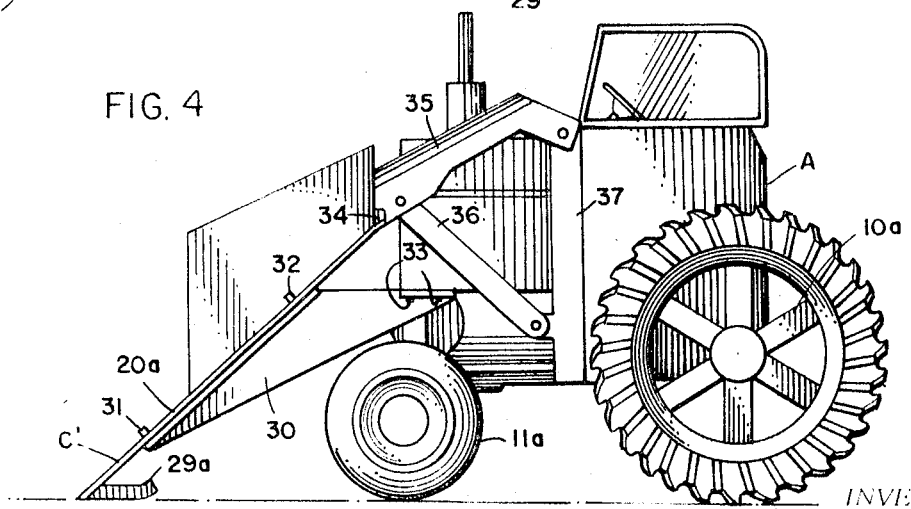

FIG. 4, a side view in elevation of a modified form of the invention.

Figure 1:
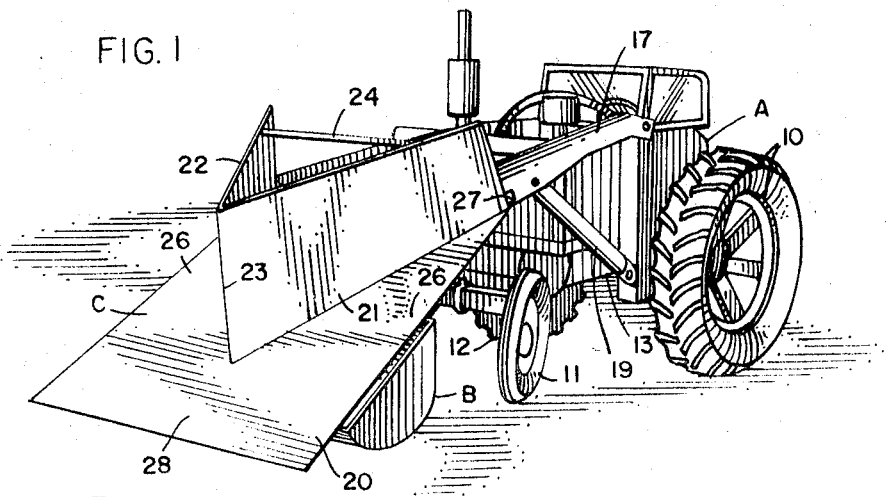
FIG. 1 is a perspective view of a snow mover anchored upon the snow bucket of a tractor and embodying my invention.
Figure 2:
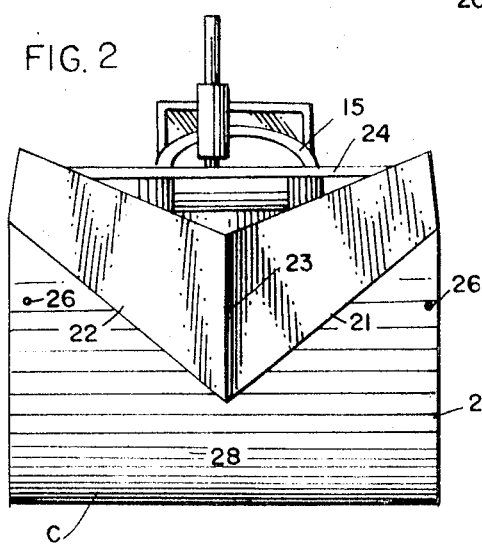
FIG. 2, is a front view in elevation.

In the illustration given in FIGS. 1—3, A designates a tractor equipped with a snow bucket B. The tractor is provided with rear wheels 10 and front wheels 11, the front wheels being mounted upon an axle 12.

The tractor is provided with a frame 13 supporting an engine or motor 14, the motor being covered by a casing 15. Secured against the rear portion of the frame 13 is a brace beam 16 upon which is mounted a raising arm 17 pivotally connected to the bucket B. A hydraulic power cylinder 18 equipped with a piston is supported for actuating the arm 17 to raise the bucket B, and a tilt hydraulic cylinder 19 may be provided for tilting the bucket B. Since all of the foregoing structure is old and well known in the art, a further detailed description herein is believed unnecessary.

Anchored upon the bucket B is the snow mover C which comprises a wide blade 20 having mounted thereon wings 21 and 22. The wings 21 and 22 are preferably welded together at their forward ends to form a generally vertical mast 23 which extends well above the blade 20, and the wings 21 and 22 are also preferably welded at their lower edges to the blade 20. To secure the rear ends of the blade, I provide a rigid rod or beam 24 which is preferably welded to the rear ends of the wings and at a point adjacent the top the engine casing 15. The upper ends of the wings 21 and 22 extend upwardly to a position adjacent the top of casing 15.

In order to removably anchor the blade 20 upon the bucket B, I provide the bucket with upwardly extending threaded bolt portions 25 which extend through openings in the blade and are secured thereon by nuts 26. If desired, the lifting arms 17 may be provided at their forward ends with abutments 27 adapted to engage the rear edges of the wings 21 and 22. The blade 20 is provided on its bottom with a bracket 20a receiving the lower edge of the bucket.

The blade 20 is preferably wider than the tractor so that it clears a path for the front and rear wheels of the tractor. The front portion 28 of the blade 20 is unobstructed so as to lift a mass of snow in a body and then the mass is engaged and divided by the V-shaped mast 23, the divided snow being then lifted to a higher elevation and pushed from the side blade 20 laterally of the tractor path. The mast 23 is preferably located at a relatively high elevation and above the axle 12 of the front wheels so that lateral moving of the snow does not occur until the snow has reached a substantial elevation and will therefore be discharged laterally of the tractor path.

If desired, the lower edge of the blade 20 may be provided with runners 29 so that the bottom edge of the blade can run along the snow surface. However, such runners may be omitted if the bucket is equipped with power-receiving means so that the blade edge can be maintained at a desired elevation.

In the operation of the structure shown in FIGS. 1—3, the tractor may be moved forwardly causing the forward edge 28 of blade 20 to raise a mass of snow and the mass is then divided at an elevation by the V-shaed mast 23, the wings 21 and 22 then serving to discharge the divided masses at higher elevations. By employing the power lift and bucket B, the blade 20 can be used in a variety of ways to handle the snow. For example, in a very high snowdrift, the blade may be first operated at a higher elevation and the elevated position of the blade causes the snow to traverse the blade more readily since it is more nearly approaching horizontal position. In a second bit, the blade may be lowered to remove the lower stratum of the snow. In all operations, the high mast 23 with the wings 21 and 22 is effective in dividing and discharging the raised snow mass.

While I prefer to employ the snow mover C with a bucket-equipped tractor, it is possible to use the mover C with an ordinary tractor A' equipped with a fixed front support 30. In the structure shown in FIG. 4, a wide blade 20a is anchored to the front support 30 by bolts 31 and 32, the support 30 being itself anchored to the tractor frame by bolts 33. The blade 20a may be provided at its bottom with runners 29a. The snow mover C' preferably bears against an abutment 34 mounted upon the frame member 35, the frame member being supported by a brace 36 bearing against the beam 37.

In both of the modifications above described, the blade quickly lifts up a mass of snow and splits the snow mass so that it may be readily pushed aside without requiring extra power, and the discharge is well above and laterally of the tractor path. The snow mover can be readily removed from the tractor after the snow season and stored until the next season. When it is attached to the snow bucket, as above described, and the bucket is hydraulically operated, a variety of operations is made possible. In the event of deep snow, the procedure is to push in the blade, raise the blade with the snow on it and push that to the side, and then to back up and start the cycle over again. Thus, the blade lifts a comparatively light weight of snow and discharges it laterally without resistance, as compared to the usual V-type snow plow which pushes against the previously banked snow in a squeezing action and thus requires extraordinary power and traction. Because of the width of the blade and its high wing structure, a single path is effective in clearing a deep snowdrift, and because the snow is delivered laterally of the tractor path, the tractor tires are unimpeded and free of side pressure.

While in the foregoing specification I have set out specific structures in considerable detail for the purpose of illustrating embodiments of my invention, it will be understood that such details may be varied widely by those skilled in the art without departing from the spirit of my invention.

I claim:

1. In combination with a motor-driven tractor having a frame equipped with a forwardly extending support and power means for raising and lowering said support, a bucket mounted on said support and having a wide top rim, a divider plow-equipped flat lift blade parallel with said bucket rim sides and resting thereon throughout the length of said bucket, an angle bracket on the bottom of said blade receiving the lower edge of said bucket rim, and fastening means at the upper rear end of said bucket rim releasably securing said blade over said rim with the bracket interlocked with the lower edge of said bucket.

2. The structure of claim 1 in which said bucket is tiltably mounted upon said support for tilting movement by said power means.

PO-1050
(5/69)

UNITED STATES PATENT OFFICE
CERTIFICATE OF CORRECTION

Patent No. 3,599,355          Dated August 17, 1971

Inventor(s) Kenneth E. Lockwood

It is certified that error appears in the above-identified patent and that said Letters Patent are hereby corrected as shown below:

On the page following the sheet containing the drawings, change "MOWER" to -- MOVER -- in the title of the patent.

On the same page, in the ABSTRACT, change "mower" to -- mover --.

In the title of the patent in column 1, change "MOWER" to -- MOVER --.

Column 1, line 5, the comma, first occurrence, should be eliminated; and line 65, after "top" insert -- of --.

Column 2, line 30, change "bit" to -- bite --.

Signed and sealed this 22nd day of February 1972.

(SEAL)
Attest:

EDWARD M. FLETCHER, JR.       ROBERT GOTTSCHALK
Attesting Officer              Commissioner of Patents